(12) United States Patent
Speller, Jr. et al.

(10) Patent No.: US 6,357,100 B2
(45) Date of Patent: *Mar. 19, 2002

(54) APPARATUS FOR ACTUATING TOOLING

(75) Inventors: Thomas H. Speller, Jr., East Aurora, NY (US); Bernhard Kittelberger, Stadtbergen (DE); Robert J. Kellner, Orchard Park, NY (US); Mark J. Andrews, Grand Island, NY (US); Bradley M. Roberts, Williamsville, NY (US)

(73) Assignee: General Electro-Mechanical Corporation, West Seneca, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/176,731

(22) Filed: Oct. 21, 1998

Related U.S. Application Data

(62) Division of application No. 08/709,694, filed on Sep. 9, 1996, now Pat. No. 5,829,115.

(51) Int. Cl.[7] ............................................... B23Q 17/00
(52) U.S. Cl. ..................... 29/407.09; 29/33 R; 29/34 B; 173/165; 173/149
(58) Field of Search .......................... 29/525.06, 243.53, 29/33 R, 34 B, 243.54, 407.09, 407.1; 173/165, 149; 72/454

(56) References Cited

U.S. PATENT DOCUMENTS

| | | |
|---|---|---|
| 434,677 A | 8/1890 | Pardy |
| 1,483,919 A | 2/1924 | Walker |
| 2,075,162 A | 3/1937 | Begg |
| 2,342,089 A | 2/1944 | Rossmann |
| 3,660,704 A | * 5/1972 | Paine ........................ 310/80 |
| 4,292,734 A | * 10/1981 | Swanson .................... 29/791 |
| 4,798,504 A | * 1/1989 | Erwin ......................... 409/2 |
| 4,864,702 A | 9/1989 | Speller, Sr. et al. |
| 4,885,836 A | 12/1989 | Bonomi et al. |
| 4,908,928 A | 3/1990 | Mazurik et al. |
| 5,060,362 A | 10/1991 | Birke et al. |
| 5,379,508 A | 1/1995 | Givler et al. |
| 5,404,633 A | 4/1995 | Givler |
| 5,477,597 A | 12/1995 | Catania et al. |
| 5,491,372 A | 2/1996 | Erhart |

FOREIGN PATENT DOCUMENTS

| | | |
|---|---|---|
| DE | 0188402 | 1/1986 |
| FR | 2544416 | 5/1984 |
| WO | WO9508860 | 3/1995 |

OTHER PUBLICATIONS

"Product Specifications—GS Series Linear Actuators," brochure of Exlar Corporation, 1995.

"Product Specifications—Exlar Roller Screws," brochure of Exlar Corporation, 1995.

"Product Specifications—FT Series Force Tubes,"brochure of Exlar Corporation, 1995.

* cited by examiner

Primary Examiner—David P. Bryant
(74) Attorney, Agent, or Firm—Hodgson Russ LLP

(57) ABSTRACT

Riveting apparatus wherein a planetary roller screw delivers the high forces required for actuating the fastener upset tooling. In order that precise control of the entire upset operation may be obtained, a servo-controlled electric motor operates the actuator. In order that different machining operations may be performed on a workpiece without having to provide an actuator for each tool, the tools are engaged in turn by the actuator for performing riveting and other machining in succession.

12 Claims, 9 Drawing Sheets

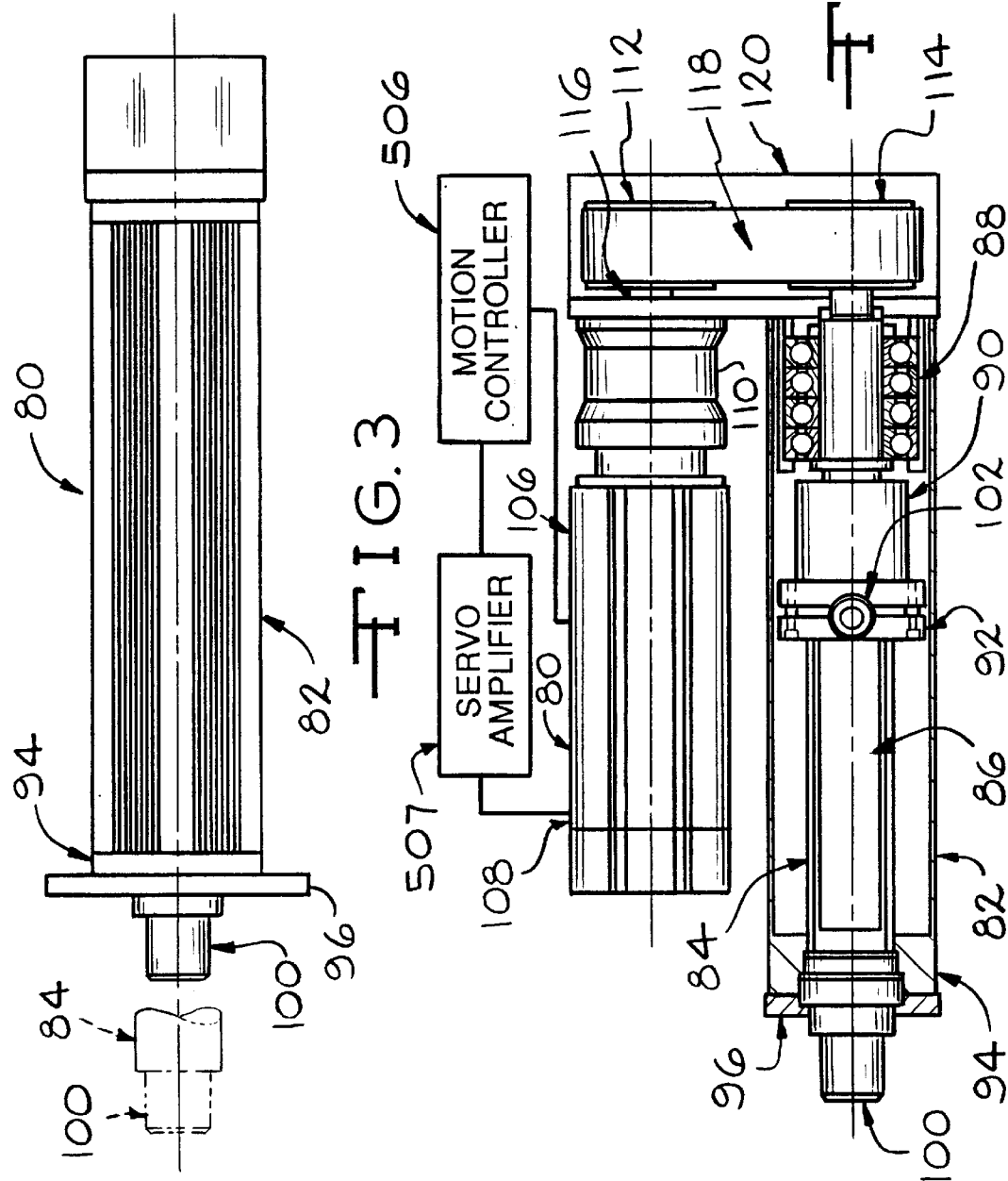

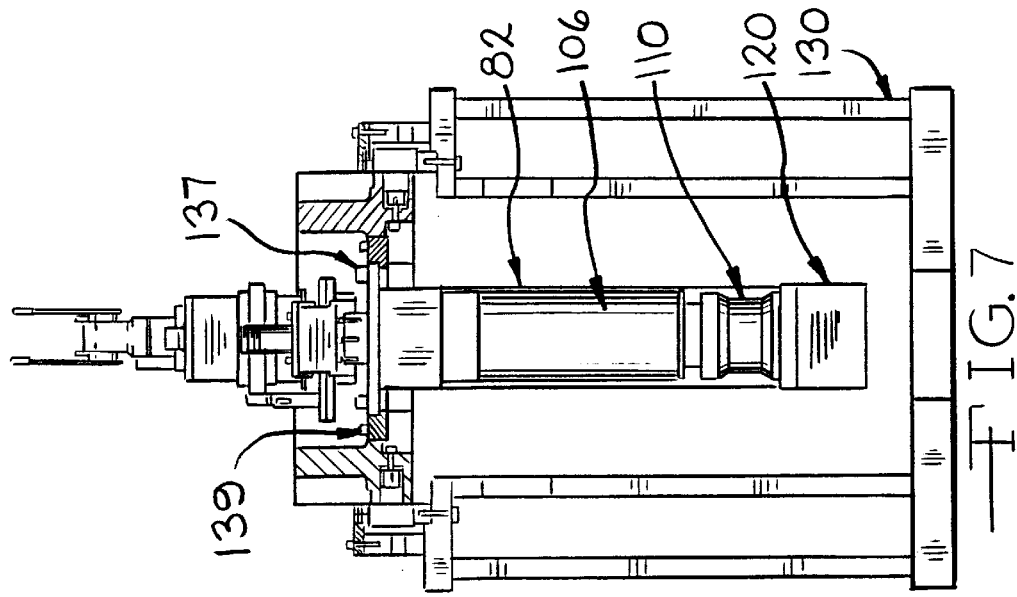
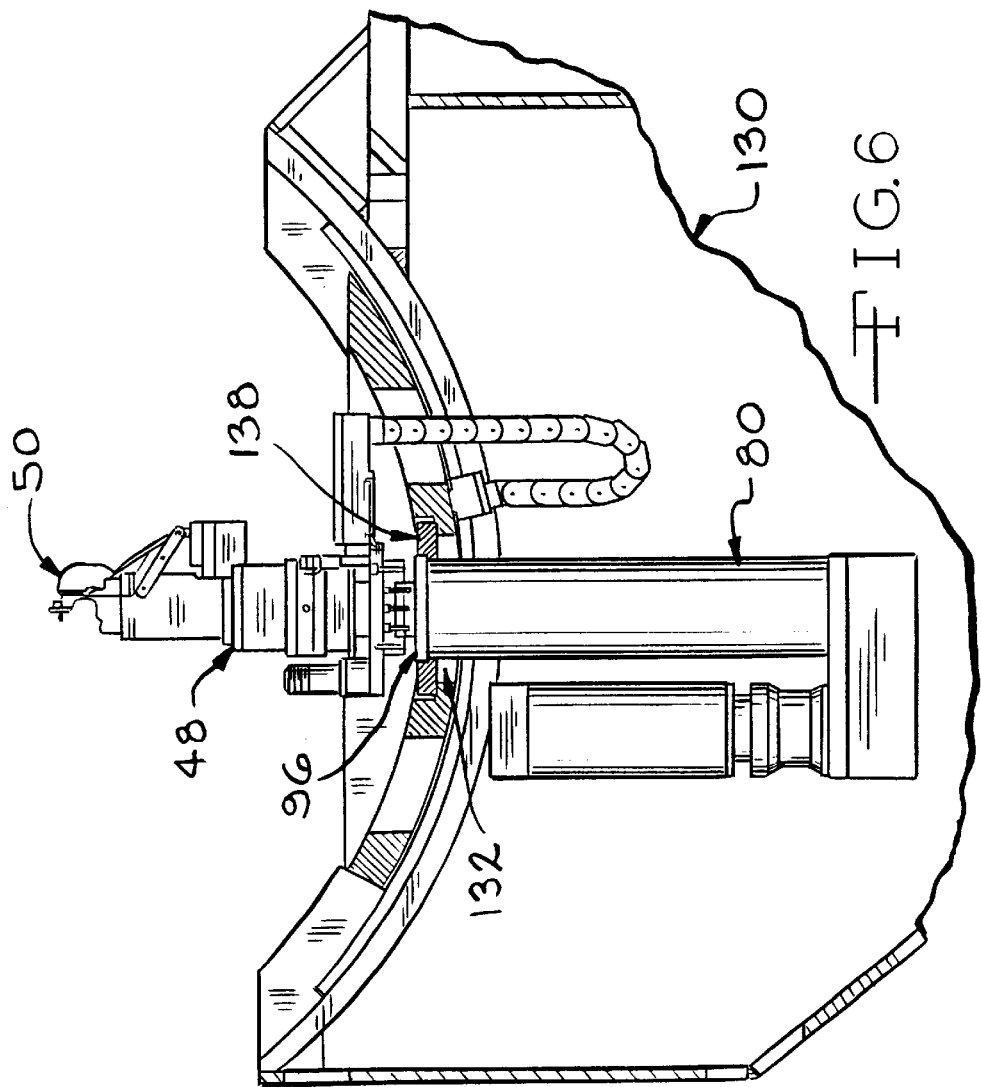

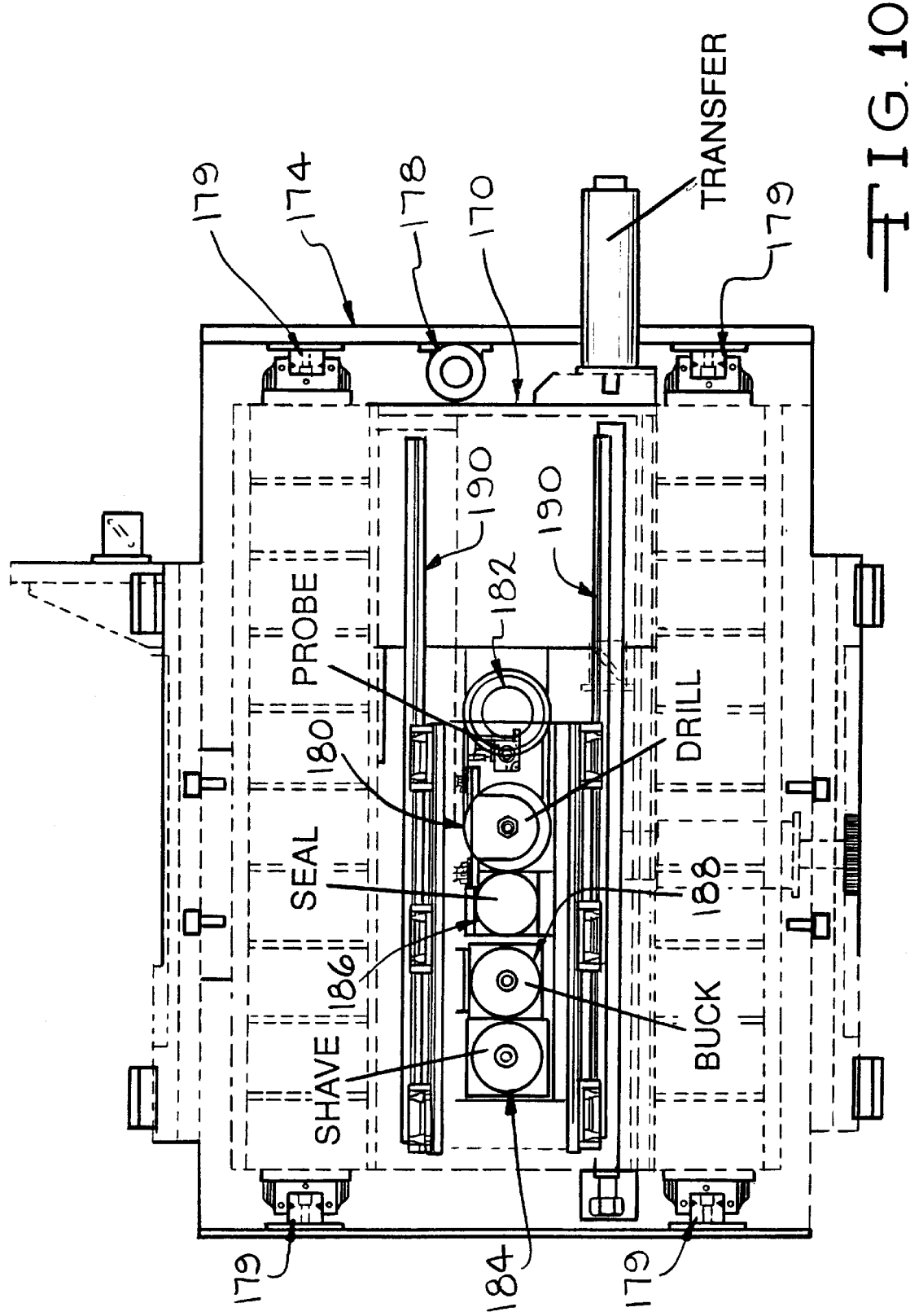

APPARATUS FOR ACTUATING TOOLING

CROSS REFERENCE TO A RELATED APPLICATIONS

This application is a division of application Ser. No. 08/709,694 filed Sep. 9, 1996 now U.S. Pat. No. 5,829,115 issued Nov. 3, 1998.

The present invention relates generally to the actuation of riveting and other tooling in the art of automatic fastening. The present invention also relates to automatic fastening apparatus including riveting apparatus.

Conventionally, riveting apparatus for airplane fuselages or wing panels and the like has been hydraulically-operated. An example of such hydraulic riveting apparatus is found in U.S. Pat. No. 5,060,362 to Birke et al, which is assigned to the assignee of the present invention and which is hereby incorporated herein by reference. However, other types of riveting apparatus such as pneumatic, electromagnetic, and roller screw have been suggested.

Pneumatic driven riveting apparatus, while typically small and hand-held, is very noisy and inefficient and difficult if not impossible to place under electronic control due to the compressibility of air.

The standard riveting apparatus for many years has been hydraulic. While hydraulic riveting apparatus has been considered quite effective and reliable, providing high linear forces for installing rivets, slugs and similar fasteners in workpieces, it has also been considered desirable that riveting apparatus be provided which is quieter, faster, and more repeatable while still having the effectiveness and reliability of hydraulic riveting apparatus.

U.S. Pat. No. 1,483,919 to Walker suggests a riveting machine which utilizes an electrically operated screw which rotates with the rotating element of the riveting motor, utilizing separate means for holding the screw against rotation during a riveting stroke and returning the screw to the starting point at the end of the riveting stroke. Walker also discusses a construction in which the screw is non-rotatable, the rotating element of the motor constituting a nut which is rotatable but held against movement in the axial direction. This actuating apparatus may not be able to generate the high forces which may be required for some riveting operations. Other art which may be of interest includes U.S. Pat. Nos. 434,677; 2,075,162; 2,342,089; and 5,404,633.

U.S. Pat. No. 5,491,372 and published International application no. PCT/US94/10232 (WO 95/08860) to Erhart, which, along with U.S. patent application Ser. No. 08/154,953 on which the International application claims priority, are hereby incorporated herein by reference, disclose an electrically powered linear actuator including an actuator assembly having an actuator rod and a thread engaging portion, a motor assembly having a stator, and a housing. The thread engaging portion of the actuator assembly is moved along the threaded extent of a cylinder on rotation thereof which cylinder functions as an armature drive cylinder. The stator is selectively energized to rotate the armature drive cylinder clockwise or counterclockwise to reciprocally move the thread engaging portion of the actuator assembly and an output shaft of the actuator. A closed-loop feedback control includes a servo-amplifier, controller, and master controller for the actuator.

Such a roller screw actuator, identified as a GS series inverted roller screw actuator, is marketed by Exlar Corporation of Chanhassen, Minn. for applications such as automated assembly, ball screw replacement, dispensers, hydraulic cylinder replacement, machine tools, pneumatic cylinder replacement, pressing, stamping, indexing stages, material cutting, precision grinders, automatic tool changers, chip and wafer handling, die cutters, formers, material handling, parts, clamping, etc. Another commercially available actuator, identified by Exlar as an FT series roller screw force tube actuator, utilizes a roller screw mounted inside a periscoping tube mechanism. Other companies such as GSA-Gewinde Satelliten Antriebe AG of Horriwil, Switzerland, INA Bearing Company, Inc. of Fort Mill, S.C., and SKF Transrol of France also provide planetary roller screws.

Riveting apparatus must be rugged and be able to apply the huge forces required for fastener upset on such workpieces as aircraft fuselages and wing panels. Thus, as previously mentioned riveting apparatus for many years has been principally hydraulic. If a non-hydraulic riveting apparatus is to become practical, it must be able to ruggedly and reliably apply such high fastener upset forces.

It is accordingly an object of the present invention to provide non-hydraulic riveting apparatus which is rugged and reliable, is able to apply the high fastener upset forces which are required, and has sufficient speed of operation, efficiency and durability.

It is another object of the present invention to provide such riveting apparatus which is quiet, safe, is easily maintained, has long life, and has quick turn-around time for repairs, yet is inexpensive and may be operated inexpensively.

It is considered desirable that the riveting apparatus be controllable throughout the entire fastener upset operation so that the apparatus may be applied to different fastener alloys and so that repeatability and uniformity rivet-to-rivet may be achieved.

It is therefore a further object of the present invention to provide non-hydraulic riveting apparatus which is controllable throughout the entire fastener upset operation.

It is yet another object of the present invention to successively perform different machining operations on a workpiece without having to provide such a riveting apparatus actuator for each tool.

In order to provide quiet, safe, effective, easily and quickly repairable, inexpensive, and reliable non-hydraulic riveting apparatus which can deliver the high upset forces, in accordance with the present invention, a planetary roller screw is provided for actuating the fastener upset tooling.

In order that precise control of the entire fastener upset operation may be obtained, in accordance with the present invention, a servo-controlled electric motor is provided for operating a screw or force tube actuator for a fastener upset tool.

In order that different machining operations may be performed on a workpiece without having to provide an actuator for each tool, in accordance with the present invention, the tools are engaged in turn by the actuator for performing riveting and other machining in succession.

The above and other objects, features, and advantages of the present invention will be apparent in the following detailed description of the preferred embodiment of the present invention when read in conjunction with the accompanying drawings wherein the same reference numerals denote the same or similar parts throughout the several views.

BRIEF DESCRIPTIONS OF THE DRAWINGS

FIG. 3 is a front view of an actuator in accordance with another alternative embodiment of the present invention.

FIG. 4 is a side view, partly in section, thereof.

FIG. 5 is a top view thereof.

FIG. 6 is a side view of the actuator of FIGS. 3, 4, and 5 attached to a riveting tool and mounted to one type of a machine frame, shown partially and in section.

FIG. 7 is a front view similar to that of FIG. 6 of the actuator, riveting tool, and machining frame thereof.

FIG. 10 is a view thereof taken along lines 10—10 of FIG. 9.

DETAILED DESCRIPTION OF THE ILLUSTRATED EMBODIMENTS

In the automatic fastening apparatus according to the present invention, the fastener upset tool as well as other tools in the apparatus, is actuated by a roller screw operated by a suitably controlled motor, the roller screw preferably being a planetary roller screw and the motor preferably being a servo-controlled electric motor. The roller screw actuator can be of various types, for example one wherein an external controlled motor causes a nut to rotate and effect linear movement of a screw shaft for driving the fastener upset tool. Alternatively, the motor armature may serve as the nut which advances along a screw which is stationary linearly, the nut causing movement of a force tube attached at one end to the nut and having the fastener upset tool on the other end thereof. In another form, the screw shaft is rotated by the motor causing linear movement of the nut which in turn causes linear movement of a force tube attached to the nut for driving the fastener upset tool. The automatic fastening apparatus of the present invention is used for installing various types of fasteners in workpieces including, but not limited to, rivets, slugs, bolts and pins.

Figure 1:
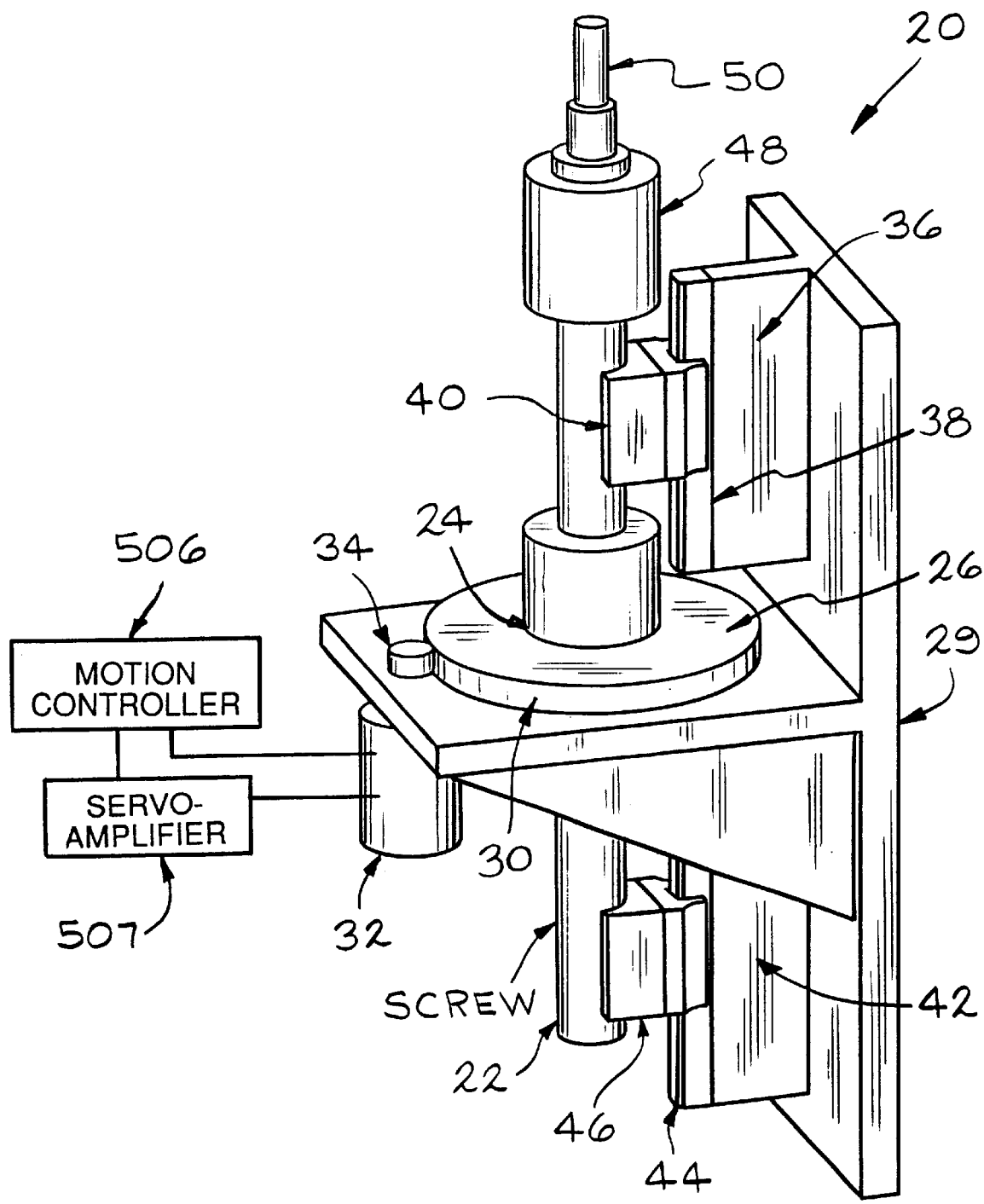
FIG. 1 is a diagrammatic perspective view of one form of riveting apparatus which embodies the present invention.

Referring now to FIG. 1, there is illustrated generally at 20 one form of the apparatus of the present invention including an electric ram comprising a threaded screw or shaft 22 and a nut 24 which threadedly engages the screw 22 to provide a ball or roller screw. The nut 24 has an enlarged circular lower portion 26 which is suitably mounted for rotation on a supporting structure 28 and has gear teeth 30 around the periphery thereof. The screw 22 passes through a hole (not shown) in the supporting structure 28. A motor 32 is suitably mounted to the supporting structure 28, and its shaft is provided with a gear 34 which engages gear 30 for rotating the nut 24 which in turn effects linear movement of the screw 22. An upper linear guide 36 comprises an elongate first member 38 which is rigidly attached to the supporting structure 28 and extends parallel to the screw 22. A second member 40 is dove-tailed with or otherwise suitably attached to member 38 for movement along the length thereof and is suitably threadedly connected to screw 22 for linear movement in response to rotation of the nut 24 in order to maintain an accurate screw position in a plane perpendicular to the longitudinal axis of the screw. A lower linear guide 42 comprises first and second members 44 and 46 respectively which are similar to first and second members 38 and 40 respectively.

The screw 22 is shown to carry or is otherwise suitably aligned to a suitable turntable/clamp cylinder 48 and a lower rivet upsetting tool or anvil 50, and linear movement of the screw 22 effects actuation thereof with enough force to upset a fastener such as a rivet or slug. As is conventionally known in the art, force is also applied to the opposite end of the fastener by another tool (not shown) for such fastener upset. This tool as well as the tooling 48 and 50 is conventional in the art and will therefore not be described further. For examples of riveting tooling and apparatus for positioning thereof, see U.S. Pat. No. 5,477,597, which is assigned to the assignee of the present invention and which is incorporated herein by reference, as well as the previously discussed U.S. Pat. No. 5,060,362.

As compared to a ball screw, wear of a roller screw is equalized over a greater contact area so that a roller screw riveter may be able to undergo an order of magnitude greater number of operating cycles before maintenance is required. This translates into longer life, and less energy use is required for operation than would be required for an equally powerful hydraulic riveter.

In order that the linear movement of the screw 22 be controllable throughout the rivet upset operation so that repeatability and uniformity rivet-to-rivet may be achieved and print-outs thereof optionally provided to the customer as well as allow application to different fastener alloys, the motor 32 is servo-controlled, i.e. motor 32 is connected to motion controller 506 and servo-amplifier 507 for control of the operation thereof, in accordance with principles well known to those skilled in the art to which this invention pertains. Such servo-control will be described in greater detail hereinafter with reference to FIG. 13. Thus, either the force or the upset distance to be applied may be precisely computer-controlled while the other is monitored to provide feedback as well as to optionally provide a print-out to the customers of the fastener upset process.

Figure 2:
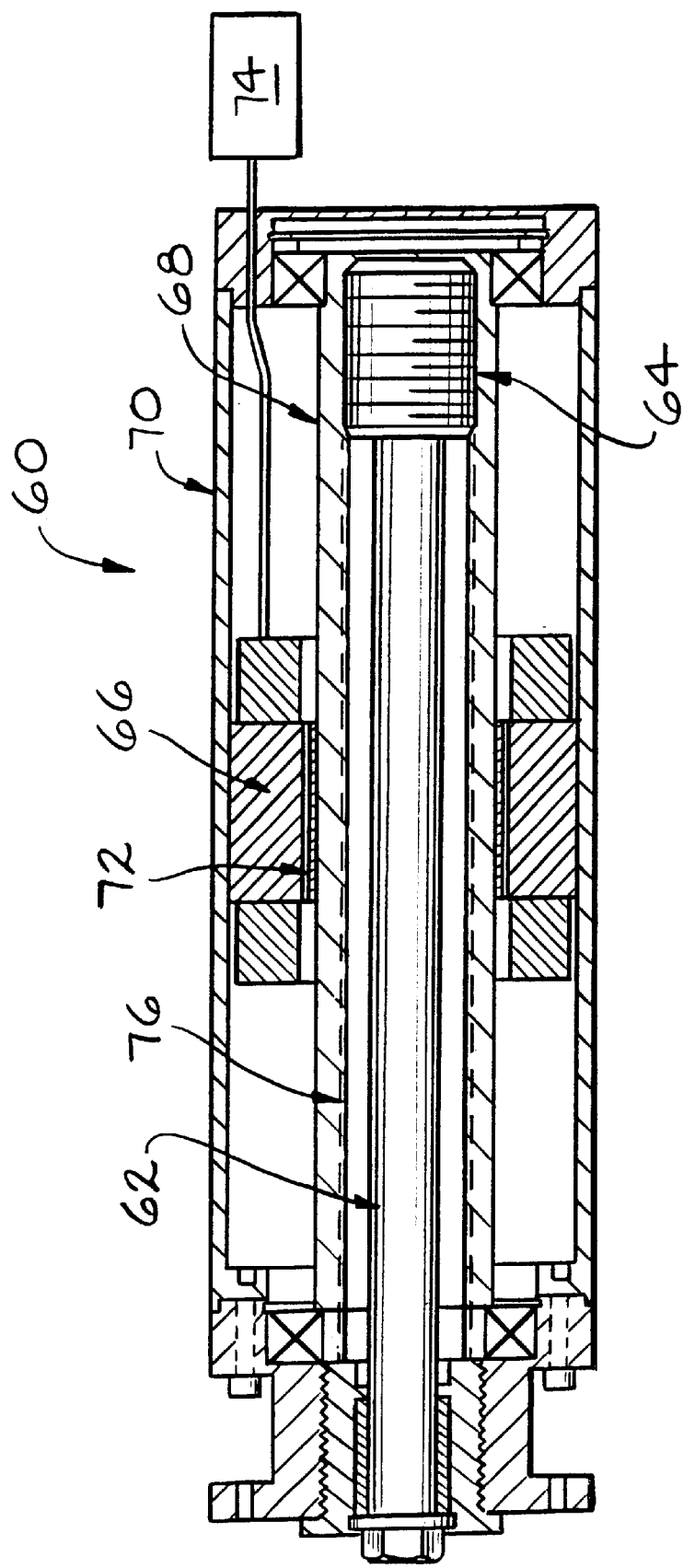
FIG. 2 is a sectional view taken along the axial length of an alternative embodiment of an actuator for the riveting apparatus of FIG. 1.

Referring to FIG. 2, there is shown an alternative embodiment of an actuator 60 for fastener upset tooling, such as the riveting tooling 48 and 50 shown on FIG. 1. The actuator assembly 60 includes a threaded output shaft 62, a plurality of transmission rollers 64, and an electric motor assembly including a stator 66 and a housing 70. The motor assembly moves the output shaft 62 between a retracted position, as seen in FIG. 2, and an extended position (not shown) and includes an elongated cylinder 68 formed of a magnetic material rotatably supported relative to the housing assembly 70. Magnets 72 are mounted about an outer surface of the cylinder 68 to form an armature (with the cylinder 68) within the motor assembly. The stator 66 is attached to and supported by the housing assembly and encircles the cylinder. An external control 74 selectively energizes the stator to rotate the armature clockwise or counterclockwise. A plurality of transmission rollers 64 are assembled in a spaced planetary arrangement around the shaft 62 (mounted for rotation about the shaft 62) and between the shaft 62 and the cylinder 68 to convert rotary motion of the cylinder 68 to linear movement of the shaft 62. Thus, the elongated cylinder 68 includes a central threaded bore 76 the threads of which are engaged by the transmission rollers 64. The output shaft 62 has annular rings for coupling with the transmission rollers 64 to move along the threaded bore 76 on rotation of the cylinder 68. Thus, the elongated cylinder 68 farms a drive cylinder within the actuator assembly as well as forming the armature of the motor assembly. This roller screw actuator 60 is described more fully in the aforesaid Erhart patent. A suitable external anti-rotation device (not shown) should be provided in accordance with principles commonly known to those of ordinary skill in the art to which this invention pertains, to prevent rotation of shaft 62 relative to housing 70. Suitable anti-rotation devices should also be provided for the other actuators described herein. Like the motor 32, the motor assembly for the actuator 60 is servo-controlled, as will be described in greater detail hereinafter with reference to FIG. 13.

Riveting operations may require forces, on the order of 50,000 lbs. or more for riveting aircraft fuselages and wing panels and the like. While the actuator 60 may be suitable for riveting operations requiring smaller forces, such huge forces may not be suitably obtainable with the actuator 60 shown in FIG. 2 because the motor assembly therefor, being constrained within the housing 70, may not be powerful enough. Referring to FIGS. 3, 4, and 5, in order to generate the forces which may be required for riveting, there is provided an alternative actuator 80 for riveting apparatus 48 and 50 which has a housing 82 from which extends an output force tube 84.

In this embodiment, a shaft or screw 86 is suitably rotatably mounted within housing 82 such as by ball bearing assembly 88. A roller screw nut 90 is suitably mounted with rollers (not shown) in a planetary arrangement around the shaft 86 and between the shaft 86 and the nut 90, similarly as illustrated in FIG. 2, for converting rotary movement of the shaft 86 to linear movement of the nut 90. The force tube 84 is suitably attached to the nut 90 such as by a suitable bracket 92 whereby advancement or retraction of the nut 90 advances or retracts the force tube 84. The output end of the force tube 84 is suitably received in a bearing 94 which is suitably mounted in the end of the housing 82 and extends through an aperture 98 in the adjacent face plate 96. The shaft 86 is telescopingly and supportively received within force tube 84. A pair of guide rollers 102 (one shown) on opposite sides respectively are provided to prevent the nut 90 and force tube 841 from rotating. The force tube 84 supports a follower member 100 which is suitably attached thereto for engaging fastener upset tooling, such as that designated 48 and 50 in FIG. 1. The extended position of the force tube 84 and follower 100 for actuating a machining tool is illustrated in phantom lines. Apertures illustrated at 104 are provided for mounting the actuator to a frame, as discussed in greater detail hereinafter. As used in the claims, a "nut" is meant to include any force tube and follower assembled therewith for linear movement.

A servo-controlled motor 106, which may be a brushless A.C. motor or other suitable motor, is provided for imparting rotary motion to the shaft 86. It is provided outside of and in the present illustration alongside (parallel to) housing 82 so that it may be large enough to generate the huge forces which may be required for some riveting operations. Alternatively, motor 106 could extend in an opposite direction from that shown in FIG. 4, and it could also be located outside of but in axial alignment with housing 82. Thus, the motor 106 is outside the roller screw housing 82, and its housing 108 is separate from housing 82. The motor 106 is suitably coupled to a gear box 110 which may, for example, provide a 3:1 planetary gear reduction for high efficiency.

Sheaves 112 and 114 are suitably attached to the gear box output shaft 116 and actuator shaft 86 respectively and coupled by a gear belt 118 or by other suitable means. The gear belt 118 is desirably enclosed in a protective guard member 120. For precise positioning and operation throughout a machining cycle, the motor 106 is servo-controlled by means of servo amplifier 507 served by computer 506, as described in greater detail hereinafter with reference to FIG. 13.

As previously discussed, an actuator such as illustrated in FIG. 2 is commercially available as the GS series inverted roller screw actuator previously referenced, and an actuator such as illustrated in FIGS. 3, 4, and 5 is commercially available as the FT series roller screw force tube actuator previously referenced. However, other suitable actuators marketed by other companies, such as those previously identified, may be incorporated in automatic fastening apparatus for riveting and the like which comes within the scope of the present invention.

Figure 8:
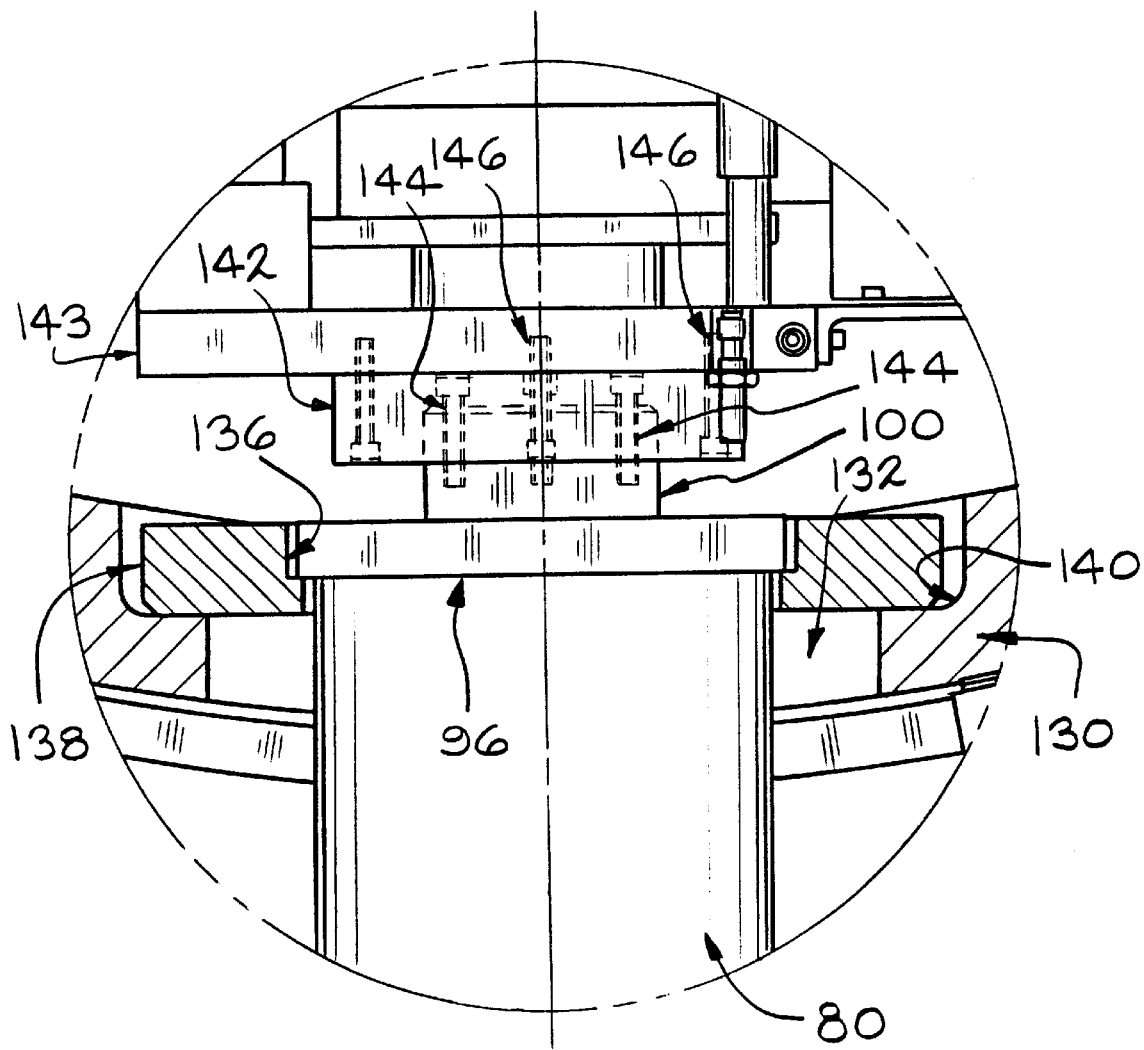
FIG. 8 is an enlarged view of the portion of FIG. 6 showing attachment of the actuator to the riveting tool.
Figure 9:
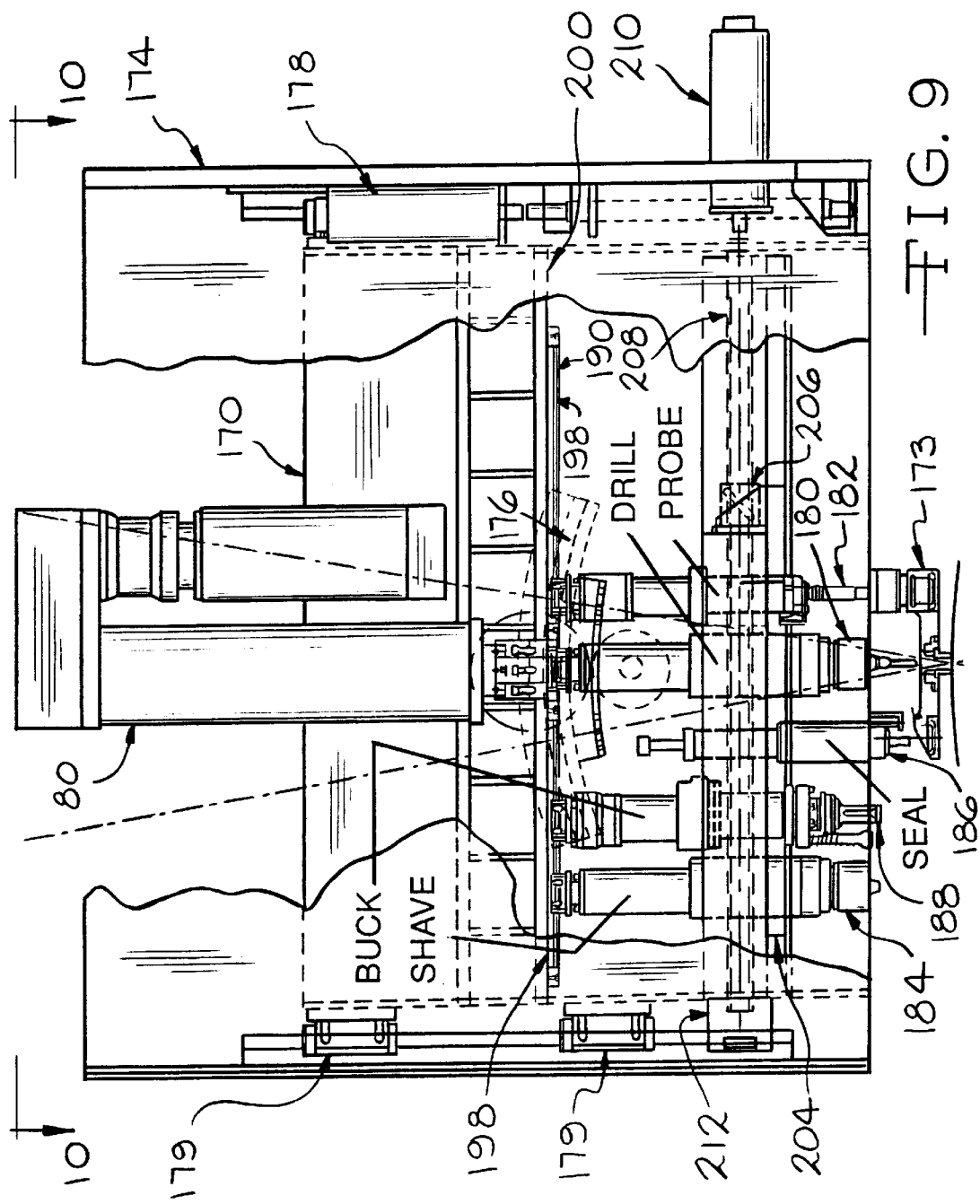
FIG. 9 is a side elevation view of another type of machine frame with the actuator of FIGS. 3, 4 and 5, a riveter, and other machining tools mounted thereto.

Referring to FIGS. 6, 7 and 8, there is shown at 130 one type of frame structure in which the roller screw actuator 80 is suitably mounted. The actuator 80 extends through an opening 132 in the frame structure 130. Its face plate or flange 96 shown in FIG. 8 is received in a pocket 136 and attached to an adaptor plate 138 by screws 137 shown in FIG. 7. Adaptor plate 138, in turn, is received in a pocket 140 in the frame structure and attached by screws 139. The frame structure 130 is provided for positioning the riveting anvil 50, as more fully described in the aforesaid U.S. Pat. No. 5,477,597. An adapter fitting 142 or other suitable structure is provided for attaching the actuator 80 to the fastener upsetting assembly 48 and 50. The fitting 142 is attached to the follower 100 by screws 144 or other suitable means and to a plate 143 of the assembly for fastener upset by screws 146 or other suitable means. However, it should be understood that the actuator 80 may not be attached to the fastener upsetting assembly but may instead be positioned in butting alignment therewith, and such an embodiment is meant to come within the scope of this invention.

Referring to FIGS. 9 to 12, there is shown actuator 80 as well as various tools described hereinafter suitably mounted to another type of frame structure 170 for movement toward and away from the workpiece 172, which is clampingly held in position for machining by pressure foot assembly 173, within larger box structure 174. Box structure 174 is in turn suitably mounted to a curved frame 176 for movement along the workpiece curvature, as more fully discussed in the aforesaid U.S. Pat. No. 5,477,597. Movement of box structure 170 is effected by travel motor 178, which is suitably attached to box structure 174 and which effects travel of box structure 170 carrying the riveting apparatus toward and away from the workplace 172, using principles well known to skilled in the art to which this invention pertains. The opposite walls of box structure 170 are guided by means of linear bearings 179.

Figure 12:
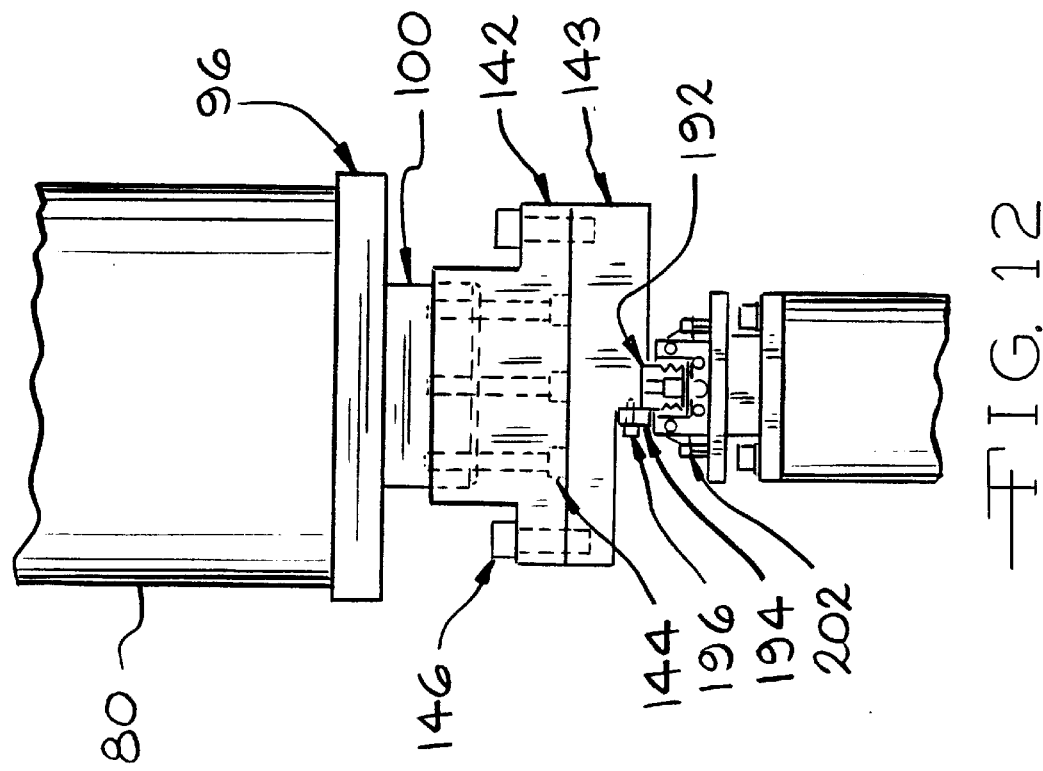
FIG. 12 is a view thereof taken along lines 12—12 of FIG. 11.
Figure 11:
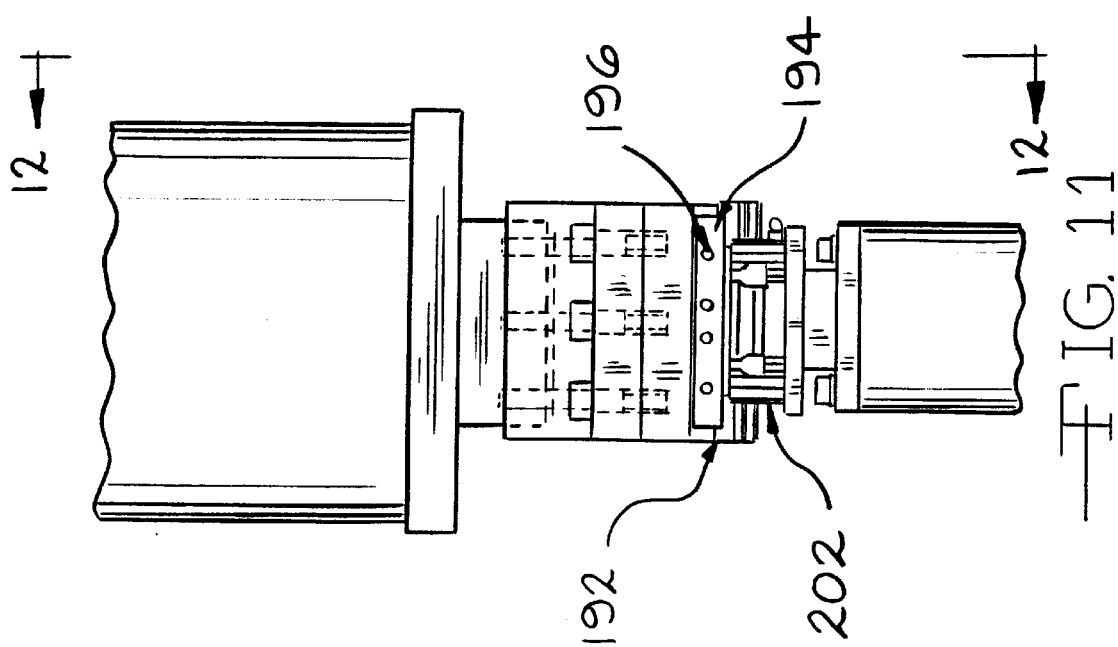
FIG. 11 is an enlarged view of a portion of the apparatus as shown in FIG. 9, showing detachable attachment of the actuator to a machine tool.

The tools for effecting a riveting operation (including the installation of two-piece fasteners and swage collars) in the workpiece 172 may include a drill 180, a hole probe 182, a shave tool 184, a seal tool 186, and a riveter or buck 188, all of which are conventional. When the box or frame structures 170 and 174 have been positioned for a riveting operation, the tools are transferred successively into position, as hereinafter described, for carrying out their respective operations so that only a single actuator is required therefor. For such transfer, the tools are all suitably mounted on a pair of parallel rails 190 for movement therealong. As shown in FIGS. 11 and 12, one portion 192 of each rail is suitably mounted, such as by bracket 194 and screws 196, to the plate 143 for linear movement therewith toward and away from the workpiece 172 when the actuator 80 effects extension and retraction respectively of the force tube and follower 100. Rail portions 198 on opposite sides of each rail portion 192 are suitably fixedly attached to a frame member 200 of box structure 170. The actuator 80 is suitably positioned so that rail portion 192 is aligned with rail portions 198 when the force tube 84 is retracted so as to provide one continuous rail over which the tools may travel, the tools being provided with members 202 which are adapted to engage the rails 190 such as in dove-tail fashion for riding therealong, in accordance with principles well known to those skilled in the art to which this invention pertains. Rails 190, including portions 192 and 198 thereof, can be of the type of linear guides commercially available from NSK of Tokyo, Japan.

The tools are also suitably mounted to a transfer plate 204 which is attached to a bracket 206 which is in turn mounted on ball screw 208. One end of the ball screw 208 is connected to the shaft of transfer motor 210 for rotation thereof to effect movement of the tools as desired along the rail 190, and the other end of the ball screw 208 is mounted in a bearing 212 on the opposite side of the box structure 170, all in accordance with principles well known to those skilled in the art to which this invention pertains.

Since the actuator motor 106 is servo-controlled and is thus controllable by a computer program which may specify a different operating speed of the actuator 80 for each of the tools, in accordance with the present invention, a single actuator 80 can thus be provided for operation of all of the tools 180, 182, 184, 186, and 188. It should be understood that the actuator may not be needed for some of the tools where precise positioning control is not required. If desired, the actuator force tube 84 and tools may alternatively be arranged so that the force tube 84 does not connect to but instead butts against ends of the tools, which would allow the screw to retract quickly and the tool to return to position more slowly. The tools may be spring biased to return to position.

As discussed in the aforesaid Erhart international application, it will be appreciated by those skilled in the art that an objective of the automatic fastening apparatus of the present invention, which incorporates the servo-controlled or closed-loop feedback controlled linear actuator, is to precisely apply linear motion to the riveting and other tools. The motion is generally programmed or defined in a computer program developed by the user of the actuator. For example, prior to using the actuator, the user enters the instructions and motion profiles into a programmable motion controller. The motion controller, when commanded, executes the user's program by signaling a servo amplifier to apply a voltage across the actuator's stator leads. The level of voltage applied is a function of the velocity specified in the user's program for the specific motion being executed. The voltage causes current to flow in the stator windings of the actuator which, in turn, applies a torque to the motor armature. In the actuator assembly, the subsequent rotation of the armature is converted mechanically within the actuator to a linear motion reflected on the actuator's output shaft.

Specific instructions for both instantaneous position and velocity are transmitted by the motion controller for each motion to be executed. In response, the amplifier applies a voltage level which represents an expected velocity output of the actuator. The expected voltage/velocity relationship is established by the user during setup and calibration of the system. It will be appreciated that for a number of reasons, the actual velocity of the output shaft seldom exactly matches what is being commanded by the motion controller. Thus, the armature shaft must be monitored to assure that the actuator produces the exact motion desired.

Figure 13:
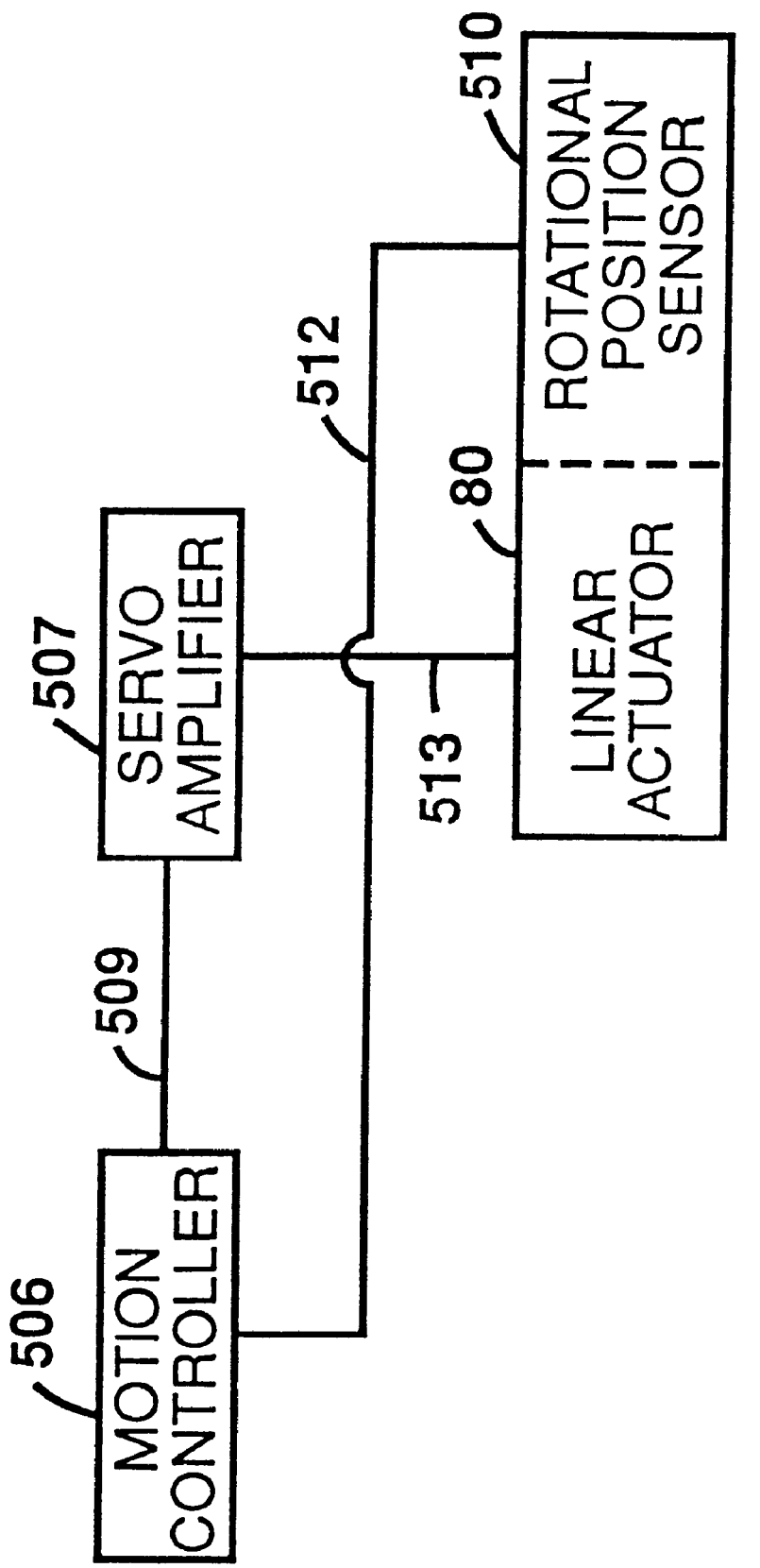
FIG. 13 is a functional block diagram illustrating servo-control of an actuator in accordance with the present invention.

Referring to FIG. 13, in the present invention, this is accomplished firstly by incorporating a velocity as derived from position feedback sensor 510 within the actuator assembly 80 and secondly by designing the servo amplifier 507 and the controller 506 such that continuous adjustments are made to the voltage applied in response to any sensed error in position and/or velocity. By doing so, continual adjustment of the system command is accomplished such that the motion produced is exactly as intended by the user. For example, if the actuator's output during a particular moment is 0.100 in. behind the target position at that moment and/or it is moving too slow relative to the instructions in the user program, then the voltage will be increased slightly to increase its speed (i.e., the controller 506 attempts to eliminate the gap between the target and actual values). This process of checking feedback and continuously correcting the command is commonly called closed-loop control.

As used in the claims, the term "servo-controlled" is intended to mean computerized control of the operation of a motor, which may utilize a predetermined program, and feedback of a condition or conditions of an actuator being driven by the motor.

In order to utilize closed-loop control, the controller 506 must receive information as to the position of the actuator's output shaft at all times. A previous method of deriving this information was to utilize a linear position sensor. Such sensors exist in many forms and include potentiometers, LVDTs, or magneto-strictive types. While the accuracy of the feedback sensor may vary without affecting control, the velocity feedback must be continuous and linear with respect to the voltage applied in order for the system to operate correctly. Likewise, the relationship between the armature's movement and the sensed position must be continuous and linear for the closed-loop system to operate correctly. However, in any screw style rotary-to-linear conversion mechanism, a small amount of backlash exists, introducing error in these systems.

Backlash results from the fact that no, mechanism can be manufactured where all the components mesh or fit perfectly (i.e., tolerances are near or are zero). Even if the components could fit perfectly and even assuming minimal wear, backlash would evolve. In the present case, it will be appreciated that backlash causes a non-linearity or discontinuity in the above described relationships at that point where the torque being applied to the armature changes direction. Any discontinuity in these relationships will confuse the controller to the extent that instability or oscillation will occur. Therefore, the point at which the greatest precision and highest stability is normally desired is also exactly the point where instability will most likely occur. More specifically, the motor servo-controller must accurately hold the desired output shaft position by applying forward or reverse movement or force in response to any sensed movement from the desired position. However, due to the tolerances that backlash creates, there is a discontinuity between the application of forward and reverse movement. As a result, the controller causes the linear actuator to hunt, or oscillate, back and forth in an attempt to maintain it in a final target position.

One approach to solving this problem is to eliminate backlash. This might be done by splitting one or more of the roller screw components in half and then preloading the pieces against each other by an adjustable spring mechanism. If this approach is utilized, it will be appreciated that the spring tension must then exceed the actuator's load capacity. However, such an approach is expensive and takes up additional space. Further, only half of the screw mechanism carries the load. While this approach may be made to work, the additional friction resulting from the high forces applied may substantially reduce the system's efficiency—thereby increasing its power consumption thus reducing the life of the unit correspondingly.

Turning to the automatic fastening apparatus of the present invention, since the position and velocity of the actuator output shaft is a known fixed ratio of the rotation of the armature, the preferred solution is to measure its rotational position and velocity and allow the motion controller 506 to calculate the resulting position of the actuator's output shaft. While backlash will allow some back and forth movement of the output shaft, when the armature is held in position, no discontinuity between the voltage applied to the armature and feedback will occur. Therefore, in the preferred embodiment, the feedback sensor 510 is mounted directly and rigidly to the armature so that stable operation may result. Using this method, the amount of backlash must only be less than the system accuracy requirements of the application (i.e., the inaccuracy allowed must be greater than the total backlash of the converting mechanism).

A rotary position/velocity sensor may, for example, be used for the feedback sensor 510, as illustrated in FIG. 13. Advantages associated with use of such a rotary feedback compared to a linear sensor device are that it is generally less expensive; it is more rugged; it does not require expensive boring of the output shaft; it mounts conveniently at the rear end of the armature; and it will be used to derive commutation signals required for brushless motors. Alternatively, employing a linear sensor would require the use of a separate motor commutation sensor.

It will be appreciated that the feedback loop normally includes some form of a proportional, integral, derivative control process equation. However, those skilled in the art will appreciate that other control equations, such as proportional, proportional-derivative, fuzzy logic, etc. and other types of control devices may also be used. For a more detailed discussion, reference may be had to Dorf, *Modern Control Systems*, pages 379 et. seq. (1981). Control equation constants for the preferred embodiment of the present system control may be derived empirically and may be changed depending upon the desired application. Additionally, those skilled in the art will appreciate that the constants may also be derived by determination of the transfer function from the steady-state response or other such methods as are well known in the art.

By using the servo-amplifier 507 and controller 506, the linear positioning of the actuator output shaft may be properly and quickly maintained for predetermined target locations. As seen in FIG. 13, closed-loop feedback control is established by the angular position control of the rotary sensor 510 which is provided to the controller 506 via line 512. The controller 506 operates in accordance with its programmed position control profile and other programming steps and provides signals to the servo amplifier 507 via line 509. In turn, the servo amplifier 507 provides the required voltage to the stator of the linear actuator 80 via line 513.

The rotary sensor 510 may, for example, be an optical digital encoder manufactured by Renco Corporation of California, under model designation RHS25D. Such devices generally operate by utilizing a light emitting device and a disk having a plurality of alternating optically transparent and opaque areas defined about the periphery. Thus, as the armature rotates, the light is alternately blocked and allowed to pass through the disk. A light sensitive device receives the light and provides a signal indicative of the light intensity received by the light sensitive device. It will be appreciated, however, that a light emitting device and a light receiving device together form an optical sensor, and that analog generators may also be utilized as part of the closed-loop feedback control loop. For another example, the rotary sensor 510 may be a resolver which converts rotary motion to position. It should of course be understood that the present invention is not limited to any particular type of rotary sensor.

As discussed hereinbefore, the actuator for riveting apparatus in accordance with the present invention may be of various types. For example, the actuator may be one wherein an external motor causes a nut to rotate and effect linear movement to a shaft. Alternatively, the motor armature may serve as the nut and effect linear movement of the shaft, as in FIG. 2. For yet another example, the shaft may be caused to rotate and effect linear movement of a nut to which a force tube is attached, as in FIGS. 3, 4, and 5. Automatic fastening apparatus including each of these types of actuators is meant to come within the scope of the present invention, and the present invention is not limited thereto.

The automatic fastening apparatus of the present invention can be utilized in apparatus wherein the tooling is moved along and about a plurality of axes, such as in a five axis riveter of the type disclosed in the U.S. Pat. No. 4,864,702 issued Sep. 12, 1989, the disclosure of which is hereby incorporated by reference. Such apparatus would be for operation on a workpiece having opposite sides and supported on a supporting surface, such as the floor of a factory, with the sides disposed substantially perpendicular to the supporting surface. The apparatus would include a frame adapted to move along the supporting surface and along the workpiece, and carriage means movably mounted on the frame. Positioning means would be carried by the carriage means, and riveting tools on first and second head means would be in spaced apart relation on the positioning means, so that the tools would be located on opposite sides of the workpiece and movable toward and away from the workpiece. The carriage means could include a pair of carriages on opposite sides of the workpiece, or a single carriage with an arrangement thereon to enable the positioning means to locate the first and second head means on opposite sides of the workpiece. Typically, an actuator of the type shown in FIG. 3–12 would be provided in each of the first and second head means for actuating the tools thereof. However, it is within the scope of the present invention to provide the actuator of the type shown in FIG. 2 or in FIG. 3–12 on one of the head means and an hydraulic or other form of actuator on the other head means. If desired, the first and second head means may be held by first and second C-frames respectively wherein the workpiece is moved between the head means for positioning thereof at various positions for machining, and one of the C-frames is rotated about an axis along which the head means are located to provide clearance for the workpiece in the various positions thereof for machining. Alternatively, the workpiece may be held in a fixed position and a C-frame moved relative thereto.

The frame of the foregoing apparatus would be movable by suitable means in a first direction along the supporting surface and along the workpiece. Means would be provided to move the carriage means in a direction substantially perpendicular to the first direction and toward and away from the supporting surface. The riveting tools would be moved toward and away from the workpiece by the actuator as described above. To accommodate curvature in the workpiece, the apparatus would include means operatively associated with the positioning means for moving the first and second head means about an axis substantially parallel to the first direction and to the supporting surface. Also to accommodate curvature in the workpiece, the apparatus would include means operatively associated with the positioning means for moving the first and second head means about an axis substantially perpendicular to the first direction and to the supporting surface.

The method of the present invention can be utilized in riveting methods and apparatus (for slugs, two-piece fasteners, and the like) of the type disclosed in U.S. Pat. No. 4,908,928 issued Mar. 20, 1990 and U.S. Pat. No. 5,060,362 issued Oct. 29, 1991, the disclosures of both of which are hereby incorporated by reference. In both methods the actuator shown in FIG. 3–12 can be employed to move either or both of the upper and lower riveting rams.

It should be understood that, while the invention has been described in detail herein, the invention can be embodied otherwise without departing from the principles thereof, and such other embodiments are meant to come within the scope of the present invention as defined by the appended claims.

What is claimed is:

1. Apparatus for actuating tooling comprising at least two tools, said apparatus comprising a shaft, a nut, means for converting rotary motion of one of said shaft and said nut to linear movement of the other of said shaft and said nut for actuating said tools, a motor means for effecting rotary movement of said one of said shaft and said nut, and means for engaging said tools by said other of said shaft and said nut in turn for enabling operations to be performed by said tools in succession.

2. Apparatus according to claim 1 wherein said converting means comprises a plurality of rollers engaged between said shaft and said nut in a planetary arrangement around said shaft.

3. Apparatus according to claim 1 wherein said motor means comprises a servo-controlled electric motor.

4. Apparatus according to claim 1 wherein one of said tools is a riveting tool.

5. Apparatus according to claim 1 wherein said engaging means comprises means for moving said tools in turn into alignment with said other of said nut and said shaft.

6. Apparatus according to claim 1 wherein said motor means includes a shaft, and the apparatus further comprises means for coupling said motor means shaft to said one of said shaft and said nut.

7. Apparatus according to claim 6 further comprising a first housing in which is contained said nut and a second housing for said motor means.

8. Apparatus according to claim 1 wherein said engaging means comprises at least one rail for receiving said tools for movement therealong, said rail having a segment attached to said other of said shaft and said nut and at least one other segment to which said a rail segment is alignable to move said tools in succession on and off said a rail segment.

9. A method of actuating tooling comprising providing at least two tools, rotating one of a nut and shaft, aligning one of the tools with the other of the nut and the shaft, converting the rotational movement of said one of the nut and shaft to linear movement of the other of the nut and shaft to actuate the aligned tool for performing a tool operations, aligning the other of the tools with the other of the nut and shaft, and converting rotational movement of said one of the nut and shaft to linear movement of the other of the nut and shaft to actuate the other aligned tool for performing a tool operation.

10. A method according to claim 9 wherein the rotational movement converting step comprises providing a planetary arrangement of rollers around the shaft and engaged between the nut and the shaft.

11. A method according to claim 9 further comprising servo-controlling the rotation of said one of the nut and shaft.

12. A method according to claim 9 wherein the step of aligning the tools comprising moving the tools in succession along at least one rail and onto a rail segment which is attached to the other of the nut and shaft.

\* \* \* \* \*